United States Patent
Uto et al.

(10) Patent No.: US 8,484,280 B2
(45) Date of Patent: Jul. 9, 2013

(54) PROGRAM, COMPUTER TERMINAL, AND COMMAND EXECUTION METHOD

(75) Inventors: Yoshihiko Uto, Tokyo (JP); Noriyuki Hiyama, Tokyo (JP); Shuntaroh Nitta, Sagamihara (JP); Makoto Watanabe, Kodaira (JP)

(73) Assignee: Namco Bandai Games Inc., Tokyo (JP)

( * ) Notice: Subject to any disclaimer, the term of this patent is extended or adjusted under 35 U.S.C. 154(b) by 469 days.

(21) Appl. No.: 12/501,789

(22) Filed: Jul. 13, 2009

(65) Prior Publication Data

US 2010/0017454 A1 Jan. 21, 2010

(30) Foreign Application Priority Data

Jul. 16, 2008 (JP) .................................. 2008-185434

(51) Int. Cl.
G06F 15/173 (2006.01)
(52) U.S. Cl.
USPC ........................................................ 709/202
(58) Field of Classification Search
None
See application file for complete search history.

(56) References Cited

U.S. PATENT DOCUMENTS

2005/0288103 A1* 12/2005 Konuma ......................... 463/42

FOREIGN PATENT DOCUMENTS

| JP | A-11-347254 | 12/1999 |
| JP | A-2006-320502 | 11/2006 |
| JP | A-2009-312 | 1/2009 |
| JP | A-2009-313 | 1/2009 |
| WO | WO 98/14898 | 4/1998 |
| WO | WO 98/14898 | * 9/1998 |
| WO | WO 99/32990 | 7/1999 |
| WO | WO 02/078808 A1 | 10/2002 |

OTHER PUBLICATIONS

European Search Report for Application No. 09165404.6, issued Feb. 9, 2010.
V-Jump books BLEACH DS $2^{nd}$ Kokui Hirameku Requiem, Manjikai Zangeki Ranbu-no-sho, first issue, Shueisha Inc., Feb. 20, 2007, p. 038 (with partial English translation).
Ragnarok Online Cho Sugoi Koryaku Yattemasu, first issue, Futabasha Publishers Ltd., Dec. 30, 2005, p. 014 (with partial English translation).
Official Guidebook of 3D Kakuto Tsukuru, the Motion Masters, first edition, ASCII Inc., Jul. 30, 1998, p. 009-010 and 146-148 (with partial English translation).

* cited by examiner

Primary Examiner — Scott Christensen
(74) Attorney, Agent, or Firm — Oliff & Berridge, PLC

(57) ABSTRACT

A program causing a computer to perform processing for executing a specific command under predetermined conditions independently of input information when automatic control information is set in association with a computer terminal and calculations are performed based on data of the computer terminal.

14 Claims, 10 Drawing Sheets

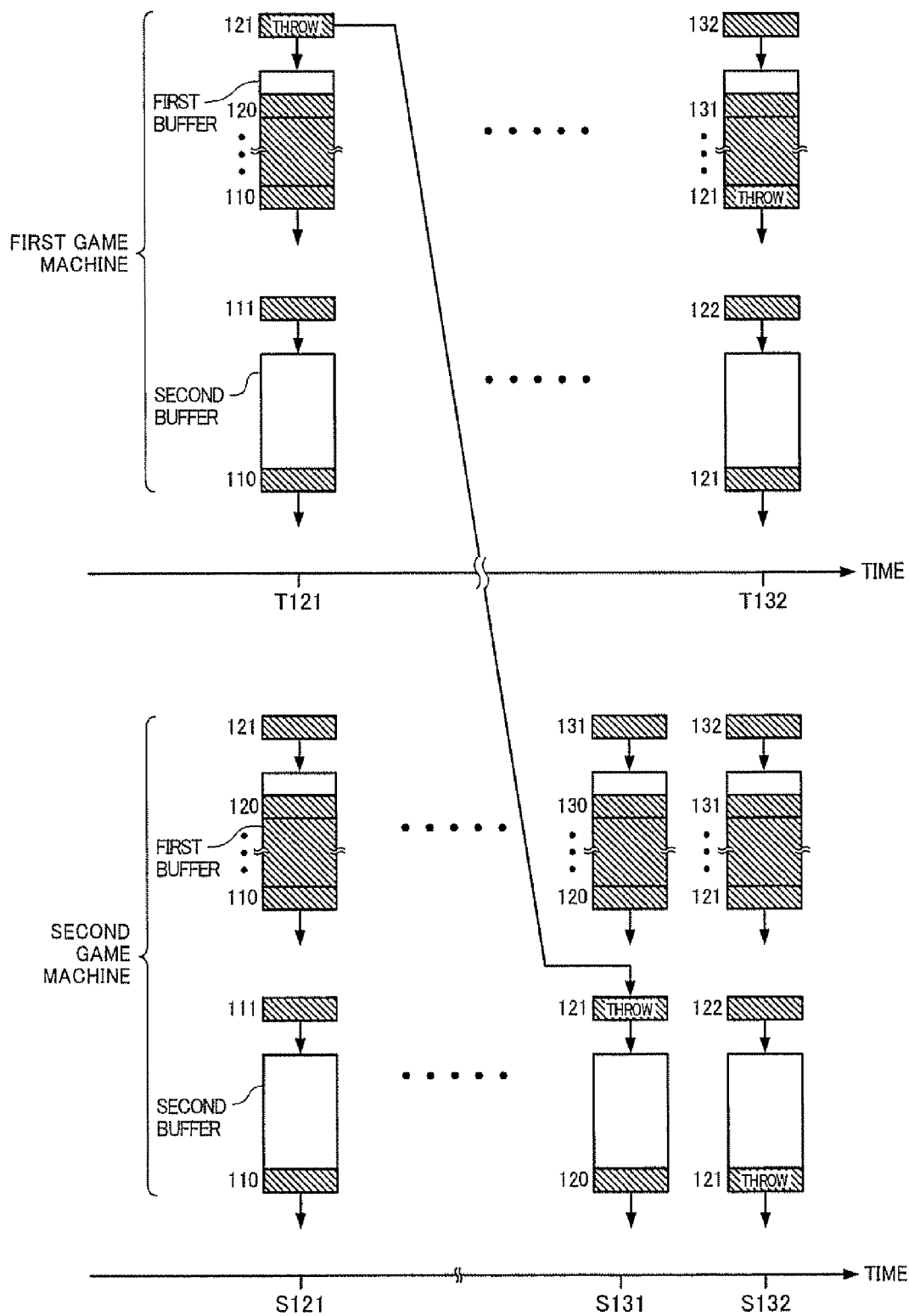

FIG.5A

| ID | RANDOM NUMBER |
|----|---------------|
| 1  | 7 |
| 2  | 1 |
| 3  | 0 |
| 4  | 1 |
| 5  | 9 |
| 6  | 5 |
| 7  | 2 |
| 8  | 3 |
| 9  | 1 |
| 10 | 4 |
| ⋮  | ⋮ |

FIG.5B

WIN DETERMINATION TABLE A

| WIN PROBABILITY | WIN RANGE |
|-----------------|-----------|
| 80 % | 2 TO 9 |

RANDOM NUMBERS RANGE: 0 TO 9

WIN DETERMINATION TABLE B

| WIN PROBABILITY | WIN RANGE |
|-----------------|-----------|
| 50 % | 5 TO 9 |

RANDOM NUMBERS RANGE: 0 TO 9

WIN DETERMINATION TABLE C

| WIN PROBABILITY | WIN RANGE |
|-----------------|-----------|
| 30 % | 7 TO 9 |

RANDOM NUMBERS RANGE: 0 TO 9

FIG.6

| GAME MACHINE IDENTIFICATION DATA | AUTOMATIC CONTROL INFORMATION FLAG | TYPE OF WIN PROBABILITY TABLE |
|---|---|---|
| GAME MACHINE 1 | 0 | NULL |
| GAME MACHINE 2 | 1 | C |

PROGRAM, COMPUTER TERMINAL, AND COMMAND EXECUTION METHOD

Japanese Patent Application No. 2008-185434 filed on Jul. 16, 2008, is hereby incorporated by reference in its entirety.

BACKGROUND OF THE INVENTION

The present invention relates to a program, a computer terminal, and a command execution method.

An online game that allows a plurality of players to participate in and play a game through a network has been known. In such an online game, since a communication delay necessarily occurs when transmitting and receiving data through a network, it takes time until the operation input performed by the player is reflected in the game.

In order to solve this problem, technology disclosed in JP-A-2006-320502 implements a quick-response game by predicting the movement of another character operated by another player based on the communication delay time of data received from another game machine so that the player's character and the other player's character maintain consistency.

However, it is difficult to employ the technology disclosed in JP-A-2006-320502 for a game in which the operation timing is important (e.g., fighting game). This is because it is very difficult to predict the movement/motion of another player's character. Moreover, even if the movement/motion of another player's character is predicted, the predicted movement/motion may not be consistent with the actual movement/motion.

Specifically, since the game process of the fighting game is performed based on data of the game machine and data received from another game machine without predicting the movement/motion of another player's character, the player cannot input specific command (e.g., throw escape command) input information at an appropriate timing when a communication delay occurs between a plurality of game machines. Such a situation is very stressful for the player who plays the fighting game.

SUMMARY

According to a first aspect of the invention, there is provided a program that is used for a computer terminal and stored in a computer-readable information storage medium, the program causing a computer to function as:

a communication control section that transmits data of the computer terminal to another computer terminal through a network, and receives data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

a calculation section that performs calculations based on the data of the computer terminal and the data of the other computer terminal that have identical identification information;

a storage section that stores whether or not automatic control information relating to a specific command is set in association with each of the computer terminal and the other computer terminal; and a command execution section that performs processing for executing the specific command when the calculation section performs the calculations, the command execution section performing processing for executing the specific command based on the input information included in the data of the computer terminal when the automatic control information is not set in association with the computer terminal, and the command execution section performing processing for executing the specific command under a predetermined condition independently of the input information included in the data of the computer terminal when the automatic control information is set in association with the computer terminal.

According to a second aspect of the invention, there is provided a program that is used for a computer terminal and stored in a computer-readable information storage medium, the program causing a computer to function as:

a communication control section that transmits data of the computer terminal to another computer terminal through a network, and receives data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

a calculation section that performs calculations based on the data of the computer terminal and the data of the other computer terminal that have identical identification information;

a storage section that stores whether or not automatic control information relating to a specific command is set in association with each of the computer terminal and the other computer terminal; and a command execution section that performs processing for executing the specific command when the calculation section performs the calculations, the command execution section performing processing for executing the specific command based on the input information included in the data of the other computer terminal when the automatic control information is not set in association with the other computer terminal, and the command execution section performing processing for executing the specific command under a predetermined condition independently of the input information included in the data of the other computer terminal when the automatic control information is set in association with the other computer terminal.

According to a third aspect of the invention, there is provided a computer terminal comprising:

a communication control section that transmits data of the computer terminal to another computer terminal through a network, and receives data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

a calculation section that performs calculations based on the data of the computer terminal and the data of the other computer terminal that have identical identification information;

a storage section that stores whether or not automatic control information relating to a specific command is set in association with each of the computer terminal and the other computer terminal; and a command execution section that performs processing for executing the specific command when the calculation section performs the calculations, the command execution section performing processing for executing the specific command based on the input information included in the data of the computer terminal when the automatic control information is not set in association with the computer terminal, and the command execution section performing processing for executing the specific command under a predetermined condition independently of the input information included in the data of the computer terminal when the automatic control information is set in association with the computer terminal.

According to a fourth aspect of the invention, there is provided a computer terminal comprising:

a communication control section that transmits data of the computer terminal to another computer terminal through a network, and receives data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

a calculation section that performs calculations based on the data of the computer terminal and the data of the other computer terminal that have identical identification information;

a storage section that stores whether or not automatic control information relating to a specific command is set in association with each of the computer terminal and the other computer terminal; and a command execution section that performs processing for executing the specific command when the calculation section performs the calculations, the command execution section performing processing for executing the specific command based on the input information included in the data of the other computer terminal when the automatic control information is not set in association with the other computer terminal, and the command execution section performing, processing for executing the specific command under a predetermined condition independently of the input information included in the data of the other computer terminal when the automatic control information is set in association with the other computer terminal.

According to a fifth aspect of the invention, there is provided a command execution method comprising:

transmitting data of a computer terminal to another computer terminal through a network, and receiving data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

performing calculations based on the data of the computer terminal and the data of the other computer terminal that have identical identification information;

storing whether or not automatic control information relating to a specific command is set in association with each of the computer terminal and the other computer terminal in a storage section; and performing processing for executing the specific command when performing the calculations, processing for executing the specific command being performed based on the input information included in the data of the computer terminal when the automatic control information is not set in association with the computer terminal, and processing for executing the specific command being performed under a predetermined condition independently of the input information included in the data of the computer terminal when the automatic control information is set in association with the computer terminal.

According to a sixth aspect of the invention, there is provided a command execution method comprising:

transmitting data of a computer terminal to another computer terminal through a network, and receiving data of the other computer terminal through the network, the data of the computer terminal including input information input through tile computer terminal and being associated with identification information of a frame of the computer terminal, and the data of the other computer terminal including input information input through the other computer terminal and being associated with identification information of a frame of the other computer terminal;

performing calculations based on the data of the computer terminal and the data of the other computer terminal that have identical identification information;

storing whether or not automatic control information relating to a specific command is set in association with each of the computer terminal and the other computer terminal in a storage section; and performing processing for executing the specific command when performing the calculations, processing for executing the specific command being performed based on the input information included in the data of the other computer terminal when the automatic control information is not set in association with the other computer terminal, and processing for executing the specific command being performed under a predetermined condition independently of the input information included in the data of the other computer terminal when the automatic control information is set in association with the other computer terminal.

BRIEF DESCRIPTION OF THE SEVERAL VIEWS OF THE DRAWING

FIGS. 4A to 4C are diagrams for describing a data input/output process of a first buffer and a second buffer according to one embodiment of the invention.

FIG. 5A is an example of a random number table, and FIG. 5B shows examples of a win determination table.

FIG. 6 is a table illustrating automatic control information according to one embodiment of the invention.

DETAILED DESCRIPTION OF THE EMBODIMENT

Figure 1:
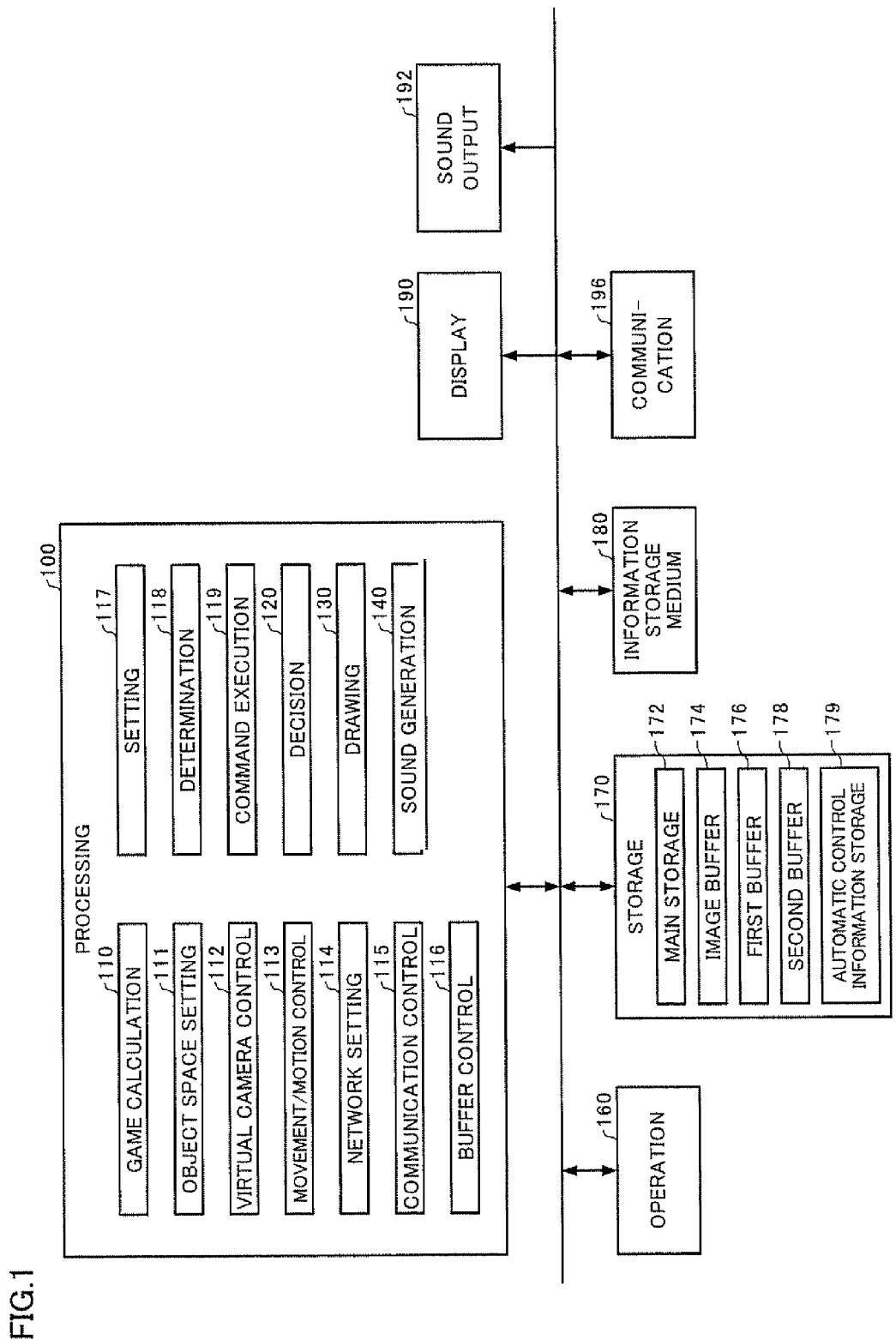
FIG. 1 is a functional block diagram showing a game machine (computer terminal) according to one embodiment of the invention.

The invention may provide a program, a computer terminal, and a command execution method that enables execution of a specific command even if a communication delay occurs in an online match game in which the specific command is executed based on input information detected within a predetermined period.

(1) According to one embodiment of the invention, there is provided a program that is used for a computer terminal and stored in a computer-readable information storage medium, the program causing a computer to function as:

a communication control section that transmits data of the computer terminal to another computer terminal through a network, and receives data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

a calculation section that performs calculations based on the data of the computer terminal and the data of the other computer terminal that have identical identification information;

a storage section that stores whether or not automatic control information relating to a specific command is set in association with each of the computer terminal and the other computer terminal; and a command execution section that performs processing for executing the specific command when the calculation section performs the calculations, the command execution section performing processing for executing the specific command based on the input information included in the data of the computer terminal when the automatic control information is not set in association with the computer terminal, and the command execution section performing processing for executing the specific command under a predetermined condition independently of the input information included in the data of the computer terminal when the automatic control information is set in association with the computer terminal.

According to one embodiment of the invention, there is provided a computer-readable information storage medium storing the above program. According to one embodiment of the invention, there is provided a computer terminal comprising the above-mentioned sections.

According to the above embodiments, even if a communication delay occurs, processing for executing the specific command can be performed under the predetermined conditions when the automatic control information relating to the specific command is set in association with the computer terminal.

(2) According to one embodiment of the invention, there is provided a program that is used for a computer terminal and stored in a computer-readable information storage medium, the program causing a computer to function as:

a communication control section that transmits data of the computer terminal to another computer terminal through a network, and receives data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

a calculation section that performs calculations based on the data of the computer terminal and the data of the other computer terminal that have identical identification information;

a storage section that stores whether or not automatic control information relating to a specific command is set in association with each of the computer terminal and the other computer terminal; and a command execution section that performs processing for executing the specific command when the calculation section performs the calculations, the command execution section performing processing for executing the specific command based on the input information included in the data of the other computer terminal when the automatic control information is not set in association with the other computer terminal, and the command execution section performing processing for executing the specific command under a predetermined condition independently of the input information included in the data of the other computer terminal when the automatic control information is set in association with the other computer terminal.

According to one embodiment of the invention, there is provided a computer-readable information storage medium storing the above program. According to one embodiment of the invention, there is provided a computer terminal comprising the above-mentioned sections.

According to the above embodiments, even if a communication delay occurs, processing for executing the specific command can be performed under the predetermined conditions when the automatic control information relating to the specific command is set in association with the other computer terminal.

(3) Each of the above program, information storage medium and computer terminal may further comprise, or may cause the computer to farther function as:

a determination section that performs processing for determining that input information associated with the specific command is valid when the input information has been input within a predetermined period, wherein the command execution section performs processing for executing the specific command based on the input information that has been determined to be valid by the determination section when the automatic control information relating to the specific command is not set in association with the computer terminal.

According to the above embodiment, even when the user who operates the computer terminal must perform an operation input associated with the specific command within the predetermined period, processing for executing the specific command can be performed under the predetermined conditions when the automatic control information is set in association with the computer terminal.

(4) Each of the above program, information storage medium and computer terminal may further comprise, or may cause the computer to further function as:

a determination section that performs processing for determining that input information associated with the specific command is valid when the input information has been input within a predetermined period, wherein the command execution section performs processing for executing the specific command based on the input information that has been determined to be valid by the determination section when the automatic control information relating to the specific command is not set in association with the other computer terminal.

According to the above embodiment, even when the user who operates the other computer terminal must perform an operation input associated with the specific command within the predetermined period, processing for executing the specific command can be performed under the predetermined conditions when the automatic control information is set in association with the other computer terminal.

(5) In each of the above program, information storage medium and computer terminal, the predetermined period may be a period depending on a predetermined command.

According to the above embodiment, even when the user who operates the computer terminal must perform an operation input associated with the specific command within a period depending on a predetermined command, processing for executing the specific command can be performed under the predetermined conditions when the automatic control information is set.

According to the above embodiment, even when the user who operates the other computer terminal must perform an operation input associated with the specific command within a period depending on a predetermined commands processing for executing the specific command can be performed under the predetermined conditions when the automatic control information is set.

(6) In each of the above program, information storage medium and computer terminal, the command execution section may perform processing for executing the specific command based on a result of a lottery process that is common to the computer terminal and the other computer terminal when the automatic control information relating to the specific command is set in association with the computer terminal.

According to the above embodiment, since the computer terminal performs the lottery process common to the computer terminal, the result of the lottery process need not be transmitted and received between the computer terminals. Therefore, processing for executing the specific command can be performed even if a communication delay occurs.

Moreover, even if the automatic control information is set in association with the computer terminal, it is uncertain whether or not processing for executing the specific command is performed. Therefore, the user who operates the computer terminal may expect that processing for executing the specific command is performed.

(7) In each of the above program, information storage medium and computer terminal, the command execution section may perform processing for executing the specific command based on a result of a lottery process that is common to the computer terminal and the other computer terminal when the automatic control information relating to the specific command is set in association with the other computer terminal.

According to the above embodiment, since the other computer performs the lottery process common to the computer terminals, the result of the lottery process need not be transmitted and received between the computer terminals. Therefore, processing for executing the specific command can be performed even if a communication delay occurs.

Moreover, even if tie automatic control information is set in association with the other computer terminal, it is uncertain whether or not processing for executing the specific command is performed. Therefore, the user who operates the other computer terminal may expect that processing for executing the specific command is performed.

(8) According to one embodiment of the invention, there is provided a command execution method comprising:

transmitting data of a computer terminal to another computer terminal through a network, and receiving data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

performing calculations based on the data of the computer terminal and the data of the other computer terminal that have identical identification information;

storing whether or not automatic control information relating to a specific command is set in association with each of the computer terminal and the other computer terminal in a storage section; and performing processing for executing the specific command when performing the calculations, processing for executing the specific command being performed based on the input information included in the data of the computer terminal when the automatic control information is not set in association with the computer terminal, and processing for executing the specific command being performed under a predetermined condition independently of the input information included in the data of the computer terminal when the automatic control information is set in association with the computer terminal, (9) According to one embodiment of the invention, there is provided a command execution method comprising:

transmitting data of a computer terminal to another computer terminal through a network, and receiving data of the other computer terminal through the network, the data of the computer terminal including input information input through the computer terminal and being associated with identification information of a frame of the computer terminal, and the data of the other computer terminal including input information input through the other computer terminal and being associated with identification information of a frame of the other computer terminal;

performing calculations based on the data of the computer terminal and the data of the other computer terminal that have identical identification information;

storing whether or not automatic control information relating to a specific command is set in association with each of the computer terminal and the other computer terminal in a storage section; and performing processing for executing the specific command when performing the calculations, processing for executing the specific command being performed based on the input information included in the data of the other computer terminal when the automatic control information is not set in association with the other computer terminal, and processing for executing the specific command being performed under a predetermined condition independently of the input information included in the data of the other computer terminal when the automatic control information is set in association with the other computer terminal.

Embodiments of the invention are described below. Note that the embodiments described below do not in any way limit the scope of the invention laid out in the claims herein. In addition, not all of the elements of the embodiments described below should be taken as essential requirements of the invention.

1. Configuration

FIG. 1 is a functional block diagram showing a game machine (computer terminal) according to one embodiment of the invention. Note that the game machine according to this embodiment may have a configuration in which some of the elements (sections) illustrated in FIG. 1 are omitted.

An operation section 160 allows a player (i.e., an operator who operates the computer terminal) to input operation information for operating a player's character (player's character, moving object, player's object, or game character operated by the player). The function of the operation section 160 may be implemented by a lever, a button, a steering wheel, a microphone, a touch panel display, a casing, or the like.

A storage section 170 serves as a work area for a processing section 100, a communication section 196, and the like. The function of the storage section 170 may be implemented by a RAM (VRAM) or the like. The storage section 170 according to this embodiment includes a main storage section 172, an image buffer 174, a first buffer 176, a second buffer 178, and an automatic control information storage section 179.

Game data including an input information detection result of the came machine is input to the first buffer 176. Game data received from another game machine is input to the second buffer 178.

The automatic control information storage section 179 stores whether or not automatic control information relating to a specific command is set in association with each game machine. The automatic control information is information that indicates that the specific command is executed independently of the input information input by the player.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), a memory card, or the like. The processing section 100 performs various processes according to this embodiment based on a program (data) stored in the information storage medium 180. Specifically, a program that causes a computer to function as each section according to this embodiment (i.e., a program that causes a computer to execute the process of each section) is stored in the information storage medium 180.

A display section 190 outputs an image generated according to this embodiment. The function of the display section 190 may be implemented by a CRT, an LCD, a touch panel display, a head mount display (HMD), or the like. A sound output section 192 outputs sound generated according to this embodiment. The function of the sound output section 192 may be implemented by a speaker, a headphone, or the like.

The communication section 196 performs various types of control for communicating with the outside (e.g., another game machine, a server, or another game system). The function of the communication section 196 may be implemented by hardware such as a processor or a communication ASIC, a program, or the like.

The game machine may download a program (data) that causes a computer to function as each section according to this embodiment from a server through a network, and store the program (data) in the information storage medium 180. The output of the program stored in the server is also included within the scope of this embodiment.

The processing section 100 (processor) performs a game calculation process, an image generation process, a sound generation process, and the like based on operation information (i.e., input information) from the operation section 160, a program, and the like. The processing section 100 performs various processes using the main storage section 172 of the storage section 170 as a work area. The function of the processing section 100 may be implemented by hardware such as a processor (e.g., CPU or DSP) or an ASIC (e.g., gate array), or a program.

The processing section 100 includes a game calculation section 110, an object space setting section 111, a virtual camera control section 112, a movement/motion processing section 113, a network setting section 114, a communication control section 115, a buffer control section 116, a setting section 117, a determination section 118, a command execution section 119, a decision section 120, a drawing section 130, and a sound generation section 140. The processing section 100 may have a configuration in which some of these sections are omitted.

The game calculation section 110 starts the game when game start conditions have been satisfied, proceeds with the game, disposes an object such as a character or a map, displays an object, calculates game result, and finishes the game when game finish conditions have been satisfied, for example.

The game calculation section 110 according to this embodiment sets the strength value of each player's character at the initial value (e.g., 100) when the came starts, performs a hit determination process every frame based on the input information input by each player during a game period (e.g., 90 seconds) (during the game), reduces the strength value of each player's character based on the hit determination result, and determines the game result (victory, defeat, or draw) based on whether or not the strength value of each player's character has reached zero. When the strength value of each player's character is larger than zero when the game period has elapsed, the game calculation section 110 determines that the player's character having a strength value larger than that of the other player has won the game. When the player's characters have an identical strength value, the game calculation section 110 determines that the game has ended in a draw.

The game calculation section 110 according to this embodiment performs game calculations every frame based on game data output from the first buffer 176 and game data output from the second buffer 178 that have identical identification information.

The game calculation section 110 according to this embodiment performs game calculations for causing a first player's character operated by the player who uses the game machine and a second player's character operated by the player who uses another game machine to make motions based on game data output from the first buffer 176 and game data output from the second buffer 178.

The game calculation section 110 according to this embodiment may perform game calculations every frame based on a plurality of pieces of game data output from the first buffer 176 and differing in identification information and a plurality of pieces of game data output from the second buffer 178 and differing in identification information. For example, the game calculation section 110 may cause the player's character to perform successive techniques based on a plurality of pieces of game data output from the first buffer 176 and having an identification number of 1 to 4 and a plurality of pieces of game data output from the second buffer 178 and having an identification number of 1 to 4.

The object space setting section 111 disposes an object (i.e., an object formed by a primitive such as a polygon, a free-form surface, or a subdivision surface) that represents a display object (e.g., player's character, moving object, building, stadium, car, tree, pillar, wall, or map (topography)) in an object space. Specifically, the object space setting section 111 determines tile position and the rotational angle (synonymous with orientation or direction) of the object in a world coordinate system, and disposes the object at the determined position (X, Y, Z) and the determined rotational angle (rotational angles around X, Y, and Z axes).

The virtual camera control section 112 controls a virtual camera for generating an image viewed from a given (arbitrary) virtual camera (viewpoint) in the object space. Specifically, the virtual camera control section 112 controls the position (X, Y, Z) or the rotational angle (rotational angles around X, Y, and Z axes) of the virtual camera (i.e., controls the viewpoint position, the line-of-sight direction, or the angle of view). The virtual camera control section 112 may control the angle of view.

For example, when photographing an object (e.g., player's character, ball, or car) from behind using the virtual camera, the virtual camera control section 112 controls the position or the rotational angle (direction) of the virtual camera so that the virtual camera follows a change in position or rotation of the object. In this case, the virtual camera control section 112 may control the virtual camera based oil information such as the position, the rotational angle, or the speed of the object obtained by the movement/motion processing section. Alternatively, the virtual camera may be rotated by a predetermined rotational angle, or may be moved along a predetermined path. In this case, the virtual camera control section 112 controls the virtual camera based on virtual camera data that specifies the position (moving path) or the rotational angle of the virtual camera. When a plurality of virtual cameras (viewpoints) are provided, the above-described control process is performed on each virtual camera.

The movement/motion processing section 113 calculates the movement/motion (movement/motion simulation) of a model (e.g., character, car, train, or airplane). Specifically, the movement/motion processing section 113 causes the model to move in the object space or causes the object to make a motion (animation) based on operation data input by the player using the operation section 160, a program (movement/motion algorithm), various types of data (motion data), and the like. Specifically, the movement/motion processing section 113 performs a simulation process that sequentially calculates movement information (position, rotational angle, speed, or acceleration) and motion information (i.e., the position or the rotational angle of each part that forms the object) of the object every frame (1/60 of a second). Note that the term "frame" refers to a time unit when performing the object movement/motion process (simulation process) or the image generation process.

The movement/motion processing section 113 according to this embodiment causes the player's character operated by the player to move or make a motion based on the input information input by the player. The movement/motion processing section 113 causes a second player's character operated by a second player who uses another game machine to move or make a motion in the same object space as the first player's character operated by the player who uses the game machine based on game data contained in a packet transmitted from the other game machine by the communication control section 115 (described later).

Specifically, the movement/motion processing section 113 according to this embodiment performs calculations for causing the first player's character operated by the player who uses the game machine to make a motion based on game data output from the first buffer 176, and performs calculations for causing the second player's character operated by the player who uses another game machine to make a motion based on game data output from the second buffer 178.

The network setting section 114 acquires and manages network information necessary for the game system. The network setting section 114 according to this embodiment acquires and manages game machine identification information assigned to each game machine (i.e., data assigned to identify each game machine that can participate in an online game) and packet destination information associated with the game machine identification information.

The destination information may be the IP address or the port number of each game machine included in the game system. The IP address may be a global IP address that specifies a specific game machine in a WAN or the Internet, or may be a private IP address that specifies a specific game machine in a LAN.

The communication control section 115 generates a packet transmitted to another game machine (second game machine), designates the IP address or the port number of the packet destination game machine, stores data contained in a received packet in the storage section 170, analyzes a received packet, and controls packet transmission/reception, for example.

The packet is a data unit transmitted through a network, and includes a header necessary for the network including a sender IP address and a destination IP address, and a payload that is data written by the sender.

When implementing an application-level communication, a packet that designates a port number that specifies the type of application corresponding to the TCP or UDP protocol used is generated. For example, the TCP protocol ensures high data transmission/reception reliability, and utilizes an acknowledgment and retransmission, for example. The TCP protocol allows lost data retransmission, and enables a packet to be transmitted to the destination game machine while maintaining the data transmission order. According to the TDP protocol, data lost during transmission is not retransmitted so that data may be transmitted in a different order. However, since the UDP protocol has no overhead, differing from the TCP protocol, the UDP protocol may be suitable for an online game that transmits data in real time. When utilizing the UDP protocol, game data is input to the buffer in the order of the identification number (ascending order). When game data having the input target identification number has not been received, the game machine may request another game machine to transmit the game data. This embodiment can deal with each protocol. When utilizing the UDP protocol, game data may be input to the buffer in an ascending order of the identification information (identification number).

The communication control section 115 according to this embodiment generates a packet according to the drawing frame rate, and transmits the generated packet to the second game machine (connection destination). Specifically, when the frame rate is 60 fps, for example, the communication control section 115 generates a packet every 1/60 of a second, and transmits the generated packet to the second game machine, the IP address and the port number of the second game machine being designated as the destination IP address and the destination port number in the header of the packet, the IP address and the port number of the first game machine being designated as the sender IP address and the sender port number in the header, and data including game data being contained in the payload of the packet. The game data transmitted by the communication control section 115 is input to the buffer 176 by the buffer control section 116 (described later) under given conditions.

The term "game data" refers to frame-unit data including the input information (including the operation information) input by the player who operates the game machine. For example, the game data may indicate the presence or absence of the input information and the details of the input information when the input information is present. For example, when the game data is indicated by a numerical value, the game data is set at "0" when the input information is absent, is set at "1" when the input information is present and indicates that a button A has been pressed, and is set at "2" when the input information is present and indicates that a button B has been pressed. The game data is set at "3" when the input information is present and indicates that the buttons A and B have been pressed.

The term "identification information" refers to data that is assigned every frame and is common to a plurality of game machines (first and second game machines). In this embodiment, the identification information may be information that is assigned every frame in accordance with the time elapsed after connection between the first game machine and the second game machine has been established. For example, the identification information may be a sequential identification number (a positive integer starting from one) assigned to game data acquired according to the frame rate.

When the frame rate is 60 fps, for example, the identification information is assigned to game data acquired every 1/60 of a second. For example, the identification number "1" is assigned to game data acquired by each of the first game machine and the second came machine when connection between the first game machine and the second game machine has been established, the identification number "2" is assigned to game data acquired when 1/60 of a second has elapsed after connection between the first game machine and the second game machine has been established, and the identification number "3" is assigned to game data acquired when 2/60 of a second has elapsed after connection between the first game machine and the second game machine has been established.

The communication control section 115 according to this embodiment receives a packet transmitted from the second game machine. The communication control section 115 analyzes the received packet, and acquires data including game data contained in the payload of the packet. The received game data is input to the second buffer 178 by the buffer control section 116 (described later).

The communication control section 115 according to this embodiment transmits and receives game data after connection between a plurality of game machines (connection between the first game machine and the second game machine) has been established until the game machines are disconnected.

Note that one of a plurality of game machines that belong to a communication group that participates in the game according to this embodiment may be specified as a host. The host may be a game machine that has generated the game space. Alternatively, when the game is a match game between a winner and a challenger, the host may be a game machine of the winner.

The buffer control section 116 according to this embodiment controls input and output of game data to and from the first buffer 176 and the second buffer 178. A process of inputting game data to a buffer refers to a process of storing the game data in a storage area allocated in the buffer, and a process of outputting game data from a buffer refers to a process of reading the game data stored in a storage area allocated in the buffer and deleting the game data from the storage area.

The buffer control section 116 according to this embodiment inputs game data of the game machine to the first buffer 176, and inputs game data of another game machine to the second buffer 178.

When the identification information corresponding to the first game data stored in the first buffer 176 coincides with the identification information corresponding to the first game data stored in the second buffer 178, the buffer control section 116 according to this embodiment outputs the first game data from the first buffer 176, and outputs the first game data from the second buffer 178. Specifically, the buffer control section 116 according to this embodiment outputs game data stored in the first buffer 176 and the second buffer 178 in an ascending order of the identification number on condition that the identification information of the game data stored in the first buffer 176 coincides with the identification information of the game data stored in the second buffer 178.

The setting section 117 sets the automatic control information relating to the specific command in the automatic control information storage section 179 before or during the game in association with each of a plurality of game machines, or based on the operation input, or when predetermined game conditions have been satisfied.

For example, the setting section 117 sets the automatic control information relating to the specific command in association with the identification information of each game machine before the game starts. The automatic control information is information that indicates that the specific command is executed under predetermined conditions independently of the input information input by the player.

The determination section 118 determines that the input information input by the player is valid when the input information associated with the specific command has been detected within a predetermined period. The term "predetermined period" refers to a period depending on a predetermined command.

For example, when throw escape input information input by the player in and associated with the specific command (throw escape command) has been detected within a period depending on a predetermined command (throw command), the determination section 118 determines that the throw escape input information is valid. The command execution section 119 executes the specific command based on the input information input by the player when game calculations are performed based on game data of a game machine for which the automatic control information is not set. Note that the command execution section 119 executes the specific command based on the input information input by the player that has been determined to be valid when game calculations are performed based on game data of a game machine for which the automatic control information is not set.

The command execution section 119 executes the specific command under predetermined conditions independently of the input information input by the player when game calculations are performed based on game data of a game machine for which the automatic control information is set.

The command execution section 119 executes the specific command based on the results of a lottery process obtained by the decision section 120 (described later) when game calculations are performed based on game data of a game machine for which the automatic control information is set.

The decision section 120 determines whether or not to perform processing for executing the specific command based on the results of the lottery process common to a plurality of game machines.

The drawing section 130 performs a drawing process based on the results of various processes (game process) performed by the processing section 100 to generate an image, and outputs the image to the display section 190. When generating a three-dimensional game image, the drawing section 130 receives object data (model data) including vertex data (e.g., vertex position coordinates, texture coordinates, color data, normal vector, or alpha value) of each vertex of the object (model), and performs a vertex process (shading using a vertex shader) based on the vertex data included in the received object data (model data). When performing the vertex process, the drawing section 130 may perform a vertex generation process (tessellation, curved surface division, or polygon division) for dividing the polygon, if necessary. In the vertex process, the drawing section 130 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results. The drawing section 130 then performs a rasterization process (scan conversion) based on the vertex data changed by the vertex process so that the surface of the poly-on (primitive) is associated with pixels. The drawing section 130 then performs a pixel process (shading using a pixel shader or a fragment process) that draws the pixels that form the image (fragments that form the display screen). In the pixel process, the drawing section 130 determines the drawing color of each pixel that forms the image by performing various processes such as a texture reading (texture mapping) process, a color data setting/change process, a translucent blending process, and an antialiasing process based on a pixel processing program (pixel shader program or second shader program), and outputs (draws) the drawing color of the object subjected to perspective transformation to the image buffer 174 (i.e., a buffer that can store image information in pixel units; VRAM or rendering target). Specifically, the pixel process includes a per-pixel process that sets or chances the image information (e.g., color, normal, luminance, and alpha value) in pixel units. The drawing section 130 thus generates an image viewed from the virtual camera (given viewpoint) in the object space. When a plurality of virtual cameras (viewpoints) are provided, the drawing section 130 may generate an image so that images (divided images) viewed from the respective virtual cameras are displayed on one screen.

The vertex process and the pixel process are implemented by hardware that enables a programmable polygon (primitive) drawing process (i.e., a programmable shader (vertex shader and pixel shader)) based oil a shader program written in shading language. The programmable shader enables a programmable per-vertex process and a per-pixel process to increase the degree of freedom of the drawing process so that the representation capability can be significantly improved as compared with a fixed drawing process using hardware.

The drawing section 130 performs a geometric process, texture mapping, hidden surface removal, alpha blending, and the like when drawing the object.

In the geometric process, the drawing section 130 subjects the object to coordinate transformation, clipping, perspective projection transformation, light source calculation, and the like. The object data (e.g., object vertex position coordinates, texture coordinates, color data (luminance data), normal vector, or alpha value) after the geometric process (after perspective transformation) is stored in the object data storage section 176.

The term "texture mapping" refers to a process that maps a texture (texel value) stored in a texture storage section of the storage section 170 on the object. Specifically, the drawing section 130 reads a texture (surface properties such as color (RGB) and alpha value) from the texture storage section of the storage section 170 using the texture coordinates set (assigned) to the vertices of the object and the like. The drawing section 130 maps the texture (two-dimensional image) onto the object. In this case, the drawing section 130 performs a pixel-texel association process, a bilinear interpolation process (texel interpolation process), and the like.

The drawing section 130 may perform a hidden surface removal process by a Z buffer method (depth comparison method or Z test) using a Z buffer (depth buffer) that stores the Z value (depth information) of the drawing pixel. Specifically, the drawing section 130 refers to the Z value stored in the Z buffer when drawing the drawing pixel corresponding to the primitive of the object. The drawing section 130 compares the Z value stored in the Z buffer with the Z value of the drawing pixel of the primitive. When the Z value of the drawing pixel is the Z value in front of the virtual camera (e.g., a small Z value), the drawing section 130 draws the drawing pixel and updates the Z value stored in the Z buffer with a new Z value.

The term "alpha blending" refers to a translucent blending process (e.g., normal alpha blending, additive alpha blending, or subtractive alpha blending) based on the alpha value (A value).

The alpha value is information that can be stored in association with each pixel (texel or dot), such as additional information other than the color information. The alpha value may be output as mask information, translucency (equivalent to transparency or opacity), bump information, or the like.

The sound generation section 140 performs a sound process based on the results of various processes performed by the processing section 100 to generate game sound such as background music (BGM), effect sound, or voice, and outputs the generated game sound to the sound output section 192.

2. Method According to this Embodiment

2.1. Outline

The game system according to this embodiment is a game system (network system) that includes a plurality of computer terminals used to play an online fighting game. Specifically, the game system according to this embodiment reduces the strength value of an opposing player's character when a player's character operated by the player has attacked and damaged the opposing player's character operated by another player, and determines victory or defeat based on the strength value of each player's character.

Figure 2:
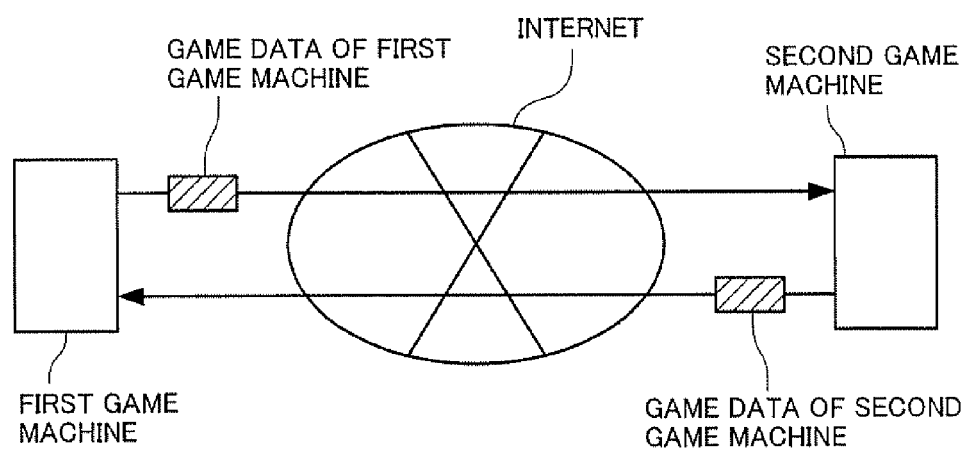
FIG. 2 is a diagram illustrating a network according to one embodiment of the invention.

FIG. 2 shows an example of a game system according to one embodiment of the invention. The game system according to this embodiment is a peer-to-peer game system that allows each game machine that participates in the online game to directly communicate and share data via the Internet. In the game system according to this embodiment, the players who participate in the online game play the game in a state in which the player's characters operated by the players are present in a single game space (object space).

In this embodiment, a first game machine (first computer terminal) and a second game machine (second computer terminal) transmit and receive game data including the detection result of input information input by the player who operates each game machine, and perform game calculations.

The game data also includes player's input information (e.g., a detection signal detected every frame based on an input using a direction key, a button A, a button B, or the like), information obtained by converting the key input detection result to a specific command, and information that indicates the absence of the input information (e.g., no-key-input information).

In this embodiment, the first game machine performs game calculations such as calculations of the movement/motion of a first player's character (i.e., a player's character operated by a first player who uses the first game machine) based on game data of the first game machine, and transmits the game data of the first game machine to the second game machine via the network. The first game machine performs game calculations such as calculations of the movement/motion of a second player's character (i.e., a player's character operated by a second player who uses the second game machine) based on game data of the second game machine received via the network. The second game machine performs game calculations in the same manner as the first game machine.

2.2. Synchronization Process

In this embodiment, the first game machine and the second game machine transmit and receive game data using a common identification number that is assigned to game data every frame in order to implement a synchronization process.

Specifically, each game machine acquires came data in a cycle corresponding to the drawing frame rate. Each game machine then assigns the identification number to the acquired game data. Specifically, when the drawing frame rate is 60 fps, each game machine sequentially assigns the identification number that is a positive integer (i.e., "1", "2", "3", "4" . . . ) to game data acquired every 1/60 of a second after connection between the first game machine and the second game machine has been established. Specifically, each game machine sequentially assigns the frame number (identification number) to game data acquired every frame (i.e., 1/60 of a second) after connection between the first game machine and the second game machine has been established.

It is desirable that the first game machine and the second game machine use an identical drawing frame rate (e.g., 60 fps) in order to accurately perform the synchronization process using game data acquired at an identical timing. The following description is given on the assumption that the drawing frame rate of the first game machine and the second game machine is 60 fps.

Note that the expression "when connection between the first game machine and the second game machine has been established" refers to the time when the first game machine has received an acknowledgment of a connection request transmitted to the second game machine and the second game machine has received an acknowledgment of a connection request transmitted to the first game machine. Note that the time when connection between the first game machine and the second game machine has been established may differ to some extent between the first game machine and the second game machine with respect to the absolute time axis.

In the game machine according to this embodiment, the first buffer 176 to which game data of the game machine is input and the second buffer 178 to which game data of another game machine is input are provided in the storage section. The game machine inputs game data of the game machine to which the identification number is assigned to the first buffer 176, and inputs game data of another game machine to which the identification number is assigned to the second buffer 178. The game machine transmits game data of the game machine to which the identification number is assigned to another game machine.

The game machine according to this embodiment outputs the first game data stored in the first buffer 176 and the first game data stored in the second buffer 178 on condition that the identification number of the first game data stored in the first buffer 176 coincides with the identification number of the first game data stored in the second buffer 178.

The game machine according to this embodiment performs game calculations such as calculations of the movement/motion of the first player's character based on the first game data output from the first buffer 176, and performs game calculations such as calculations of the movement/motion of the second player's character based on the first game data output from the second buffer 178. Specifically, game data is input to and output from the first buffer 176 and the second buffer 178 by a first-in first-out (FIFO) method.

A process in which the first game machine inputs and outputs game data of the first game machine to and from the first buffer 176 and inputs and outputs game data of the second game machine to and from the second buffer 178 is described in detail below with reference to FIG. 3.

In this embodiment, the first game machine inputs game data of the first game machine having an identification number "1" to the first buffer 176 at a time T1 when connection between the first game machine and the second game machine is established. Since the first game machine has not received game data from the second game machine at the time T1, the second buffer 178 is empty.

When the first game machine has received game data having an identification number "1" from the second game machine at a time T11, the first game machine inputs game data having an identification number "11" to the first buffer 176 and inputs the game data having the identification number "1" that has been received from the second game machine to the second buffer 178.

Therefore, since the identification number of the first game data stored in the first buffer 176 coincides with the identification number of the first game data stored in the second buffer 178 (identification number="1"), the first game machine outputs the game data having the identification number "1" from the first buffer 176 and the second buffer 178, and performs game calculations based on the output game data, According to this embodiment, since each of the first game machine and the second game machine transmits and receives game data using a common identification number that is provided every frame and performs game calculations based on the first game data of the first game machine and the second game machine on condition that the identification number of the first game data of the first game machine coincides with the identification number of the first game data of the second game machine, the first player and the second player can play the online fighting game under equal conditions. According to this embodiment, each game machine can perform game calculations so that the same game result is obtained.

2.3. Validity of Input Information

In this embodiment, an input information flag is set for each of the first buffer 176 and the second buffer 178, and the value of the input information flag of each of the first buffer 176 and the second buffer 178 is updated every frame to control the validity/non-validity of the input information.

A process of updating the value of the input information flag is described below. In this embodiment, the value of the input information flag in a period in which the player's character does not make a motion is updated to true (1), and the value of the input information flag in a period in which the player's character makes a motion is updated to false (0) for each frame. The value of the input information flag of each buffer is set to be true in a default state (e.g., initial state).

A specific process performed by the first game machine is described below. When the first game machine has determined to cause the first player's character to perform a right punch motion based on right punch input information output from the first buffer 176, the first game machine updates the value of the input information flag of the first buffer 176 with false. Tile first game machine sets the value of the input information flag of the first buffer 176 to be false in a period (e.g., a period corresponding to 10 frames) in which the first player's character makes a right punch motion, and sets the value of the input information flag of the first buffer 176 to be true after a period in which the first player's character makes a right punch motion has elapsed.

When the first player's character and the second player's character are positioned within a predetermined range (i.e., the second player's character is punched) and the first game machine determines to cause the second player's character to be subjected to a right punch attack, the first game machine sets the value of the input information flag of the second buffer 178 to be false. The first game machine sets the value of the input information flag of the second buffer 178 to be false in a period (e.g., a period corresponding to 10 frames) in which the second player's character is subjected to a right punch attack, and sets the value of the input information flag of the second buffer 178 to be true after a period in which the second player's character is subjected to a right punch attack has elapsed.

A process of determining the validity/non-validity of the input information according to this embodiment is described below. In this embodiment, the input information output from tile first buffer 176 is determined to be valid when the input information flag of the first buffer 176 is true, and the input information output from the first buffer 176 is determined to be invalid when the input information flag of the first buffer 176 is false.

In this embodiment, the input information output from the second buffer 178 is determined to be valid when the input information flag of the second buffer 178 is true, and the input information output from the second buffer 178 is determined to be invalid when the input information flag of the second buffer 178 is false.

Specifically, a command is executed based on the input information determined to be valid. When motion calculations have started, other motion calculations are not performed until the calculations are completed.

In this embodiment, even if the input information output from the buffer has been determined to be invalid, the validity/non-validity of predetermined input information may be determined regardless of whether the input information flag is true or false. This applies to the throw escape input information, for example.

A throw command according to this embodiment is described below. Specifically, when one player has performed a throw key input, motion calculations that cause the player's character to catch another player's character are performed. When the player's character has been determined to hit the other player's character, motion calculations that cause the player's character to throw the other player's character and motion calculations that cause the other player's character to be thrown are performed. This causes the other player's character to be damaged to reduce the strength value. When the player's character has been determined to miss the other player's character, the player's character cannot catch the other player's character and stands ready. Specifically, the other player's character is not damaged.

A throw escape command according to this embodiment is described below. The throw escape command according to this embodiment causes the other player's character to escape a throw performed by the player's character. Specifically, when the other player has performed a throw escape key input within a predetermined period after the player has performed a throw key input, motion calculations that cause the other player's character to make a throw escape motion when the other player's character is thrown are performed. Specifically, the other player's character is not damaged due to the throw attack so that a value corresponding to the throw attack is not subtracted from the strength value.

A case where the throw escape input information is determined to be valid is described below.

In this embodiment, the value of the input information flag of the second buffer 178 is set to be false in a period in which the second player's character is thrown. Specifically, the input information output from the second buffer 178 is determined to be invalid in a period in which the second player's character is thrown.

In this embodiment, even in a period in which the second player's character is thrown, the throw escape input information is determined to be valid (i.e., the throw escape command is executed) on condition that the throw escape input information has been output from the second buffer 178 within a predetermined period (e.g., a period corresponding to three frames) immediately after the first player's character has hit the second player's character.

On the other hand, when the throw escape input information has been output from the second buffer 178 in a period other than the predetermined period (e.g., a period corresponding to three frames) immediately after the first player's character has hit the second player's character, the throw escape input information is determined to be invalid (i.e., the throw escape command is not executed).

2.4. Communication Delay

Since the game system according to this embodiment performs the synchronization process, it takes time until the input information input by the player is reflected in the game.

Figure 3:
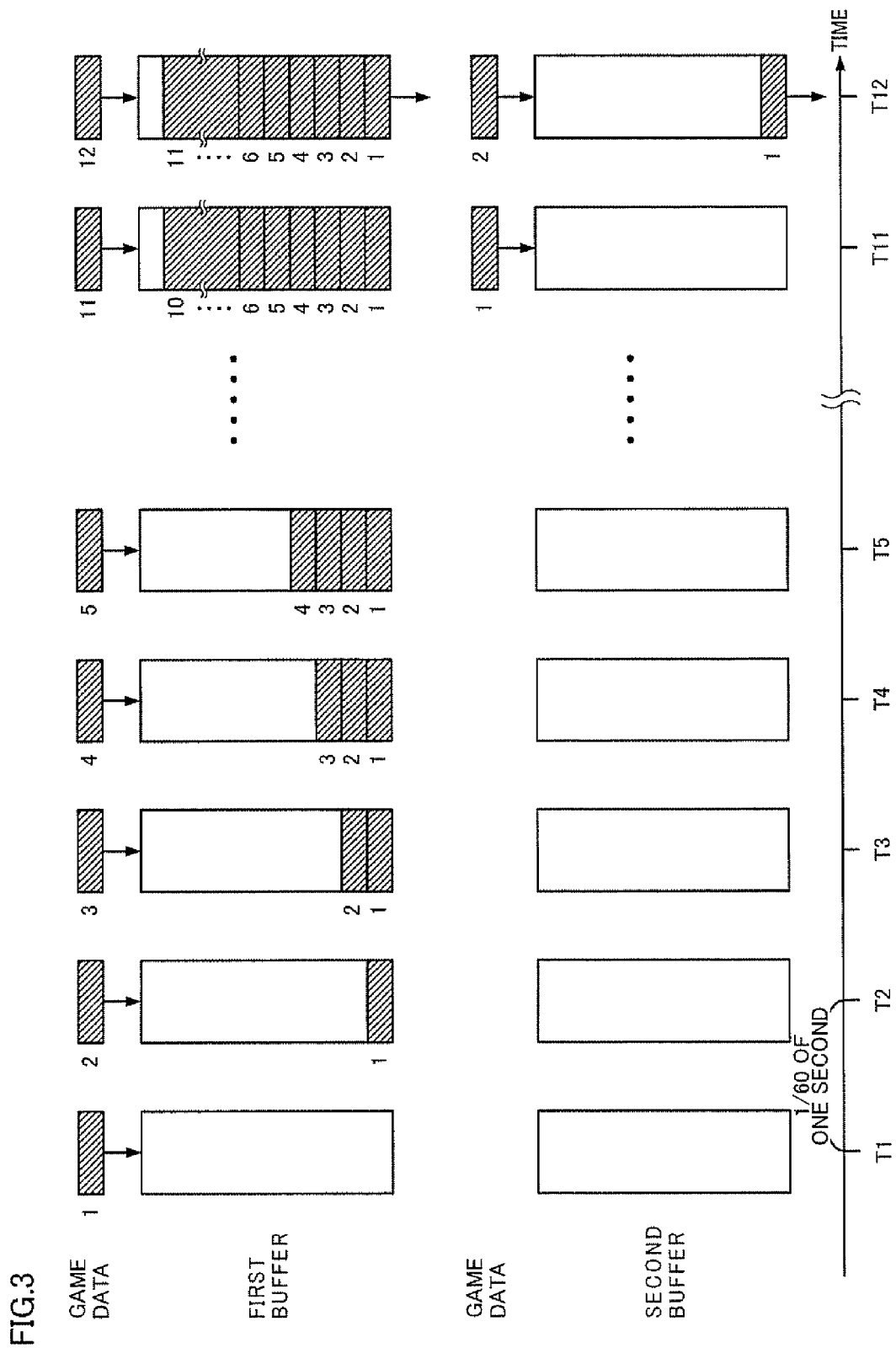
FIG. 3 is a diagram for describing a synchronization process.

As illustrated in FIG. 3, game calculations based on game data having an identification number "1" are performed at a time T12 even though the input information has been detected at a time T1. Specifically, since a communication delay time (time lag) necessarily occurs when game data is transmitted and received between the first game machine and the second game machine, a problem may occur. A problem that may occur due to the communication delay time is described below with reference to FIGS. 4A to 4C.

As illustrated in FIG. 4A, when the throw input information from the first player has been detected at a time T121, the first game machine inputs the throw input information from the first player to which an identification number "121" is assigned to the first buffer 176, and transmits the throw input information to the second game machine at the time T121.

The first game machine receives game data having an identification number "121" from the second game machine (time T131), and outputs the game data having an identification number "121" (time T132). The throw input information having the smallest identification number "121" is output from the first buffer 176 at the time T132. When the first game machine has determined that the throw input information is valid, the first game machine executes the throw command.

Figure 4B:
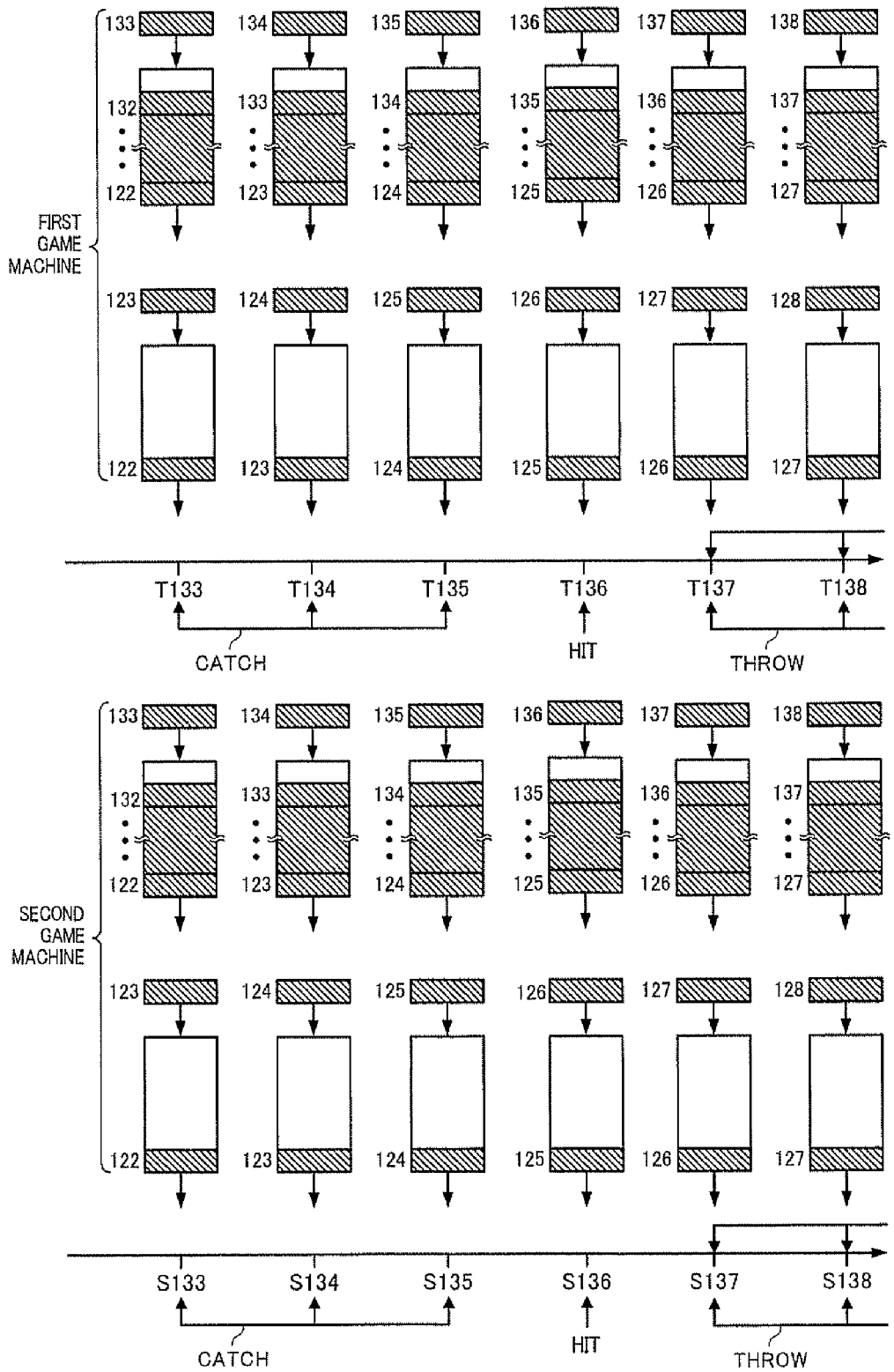

As illustrated in FIG. 4B, the first game machine performs motion calculations that cause the first player's character to catch the second player's character based on the throw command from a time T133 to a time T135, for example. The first game machine determines that the first player's character has hit the second player's character at a time T136.

The first game machine performs motion calculations that cause the first player's character to throw the second player's character from a time T137 to a time T150 after the first player's character has hit the second player's character. The first game machine determines that the throw escape input information included in the game data output from the second buffer 178 is valid within a predetermined period (T137 to T139) immediately after the first player's character has hit the second player's character (T136).

Therefore, when game data having an identification information of "126" to "128" is output in the predetermined period (T137 to T139) (see FIG. 4B), throw escape game data is output in the predetermined period (T137 to T139) when the throw escape input information has been detected in a period from the time T126 to the time T128, and the throw escape input information is determined to be valid.

In the first game machine, game data having an identification number of "126" to "128" is output from the first buffer 176 and the second buffer 178 in a period from the time T137 to the time T139. In the second game machine, game data having an identification number of "126" to "128" is also output from the first buffer 176 and the second buffer 178 in a period from the time T137 to the time T139.

Figure 4C:
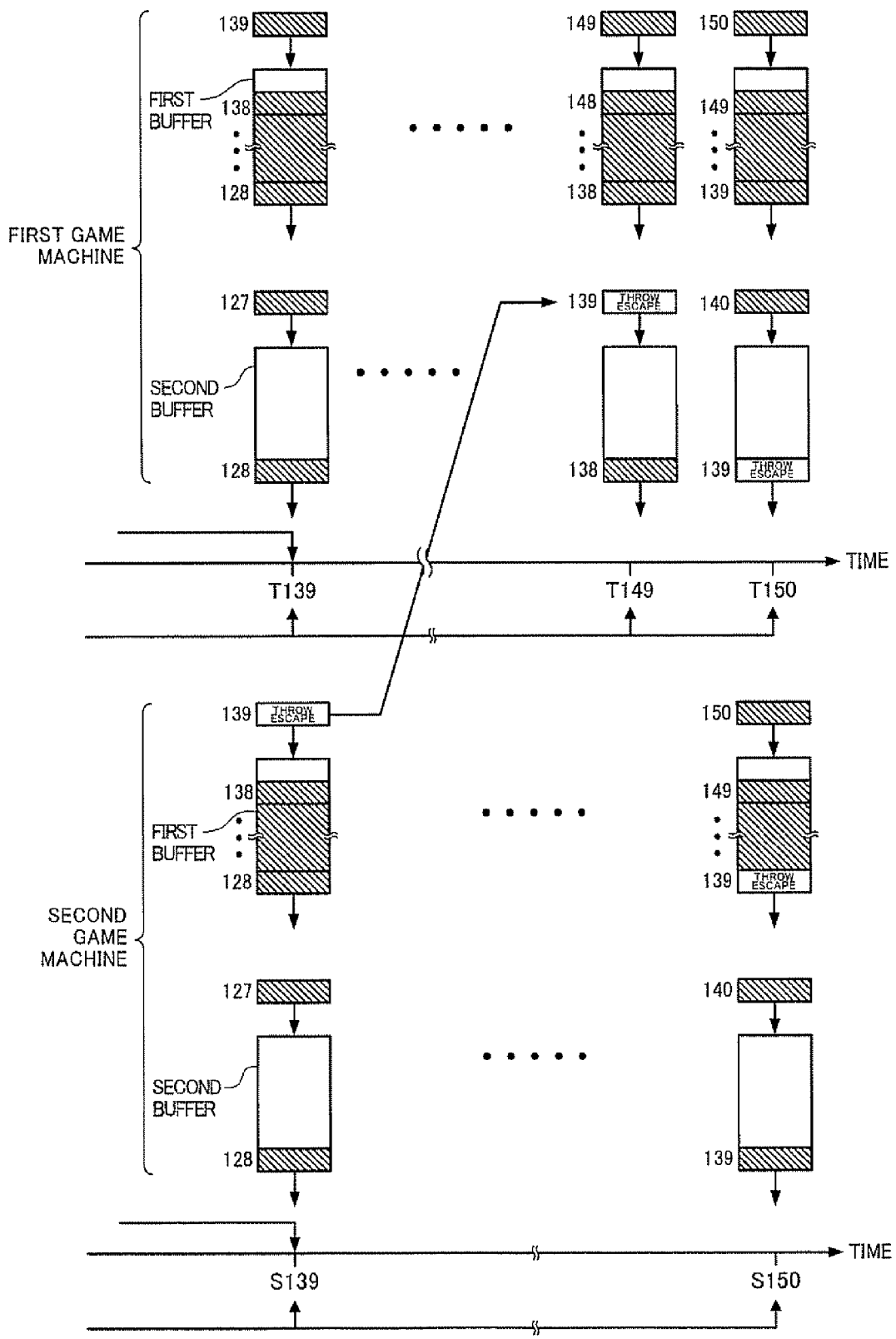

As illustrated in FIG. 4C, when the player of the second game machine has become aware that the second player's character has been thrown at the time S138 and input the throw escape input information at the time S139 so that the second game machine has detected the throw escape input information input by the second player at the time S139, throw escape game data having an identification number "139" is input to the first buffer 176 of the second game machine and transmitted to the first came machine.

The first came machine receives the throw escape input information having an identification number "139" input by the second player at the time T149, and inputs the throw escape input information to the second buffer 178 of the first game machine, and throw escape game data having an identification number "139" is output from the second buffer 178 at the time T150.

However, since the throw escape game data having an identification number "139" is not output within the predetermined period (T137 to T139), the throw escape input information is determined to be invalid (i.e., the throw escape command is not executed).

Likewise, since the second game machine determines that the throw escape input information input at the time T139 is invalid, the throw escape command is not executed.

Specifically, when employing the game system according to this embodiment that performs the synchronization process, the throw escape command may not be executed due to the communication delay time although the second player believes that the throw escape key input timing is appropriate.

In this embodiment, since the second player of the second game machine must input the throw escape input information in a period from the time T126 to the time T128 before the catch motion is displayed in a period from the time T133 to the time T136 so that the throw escape command is executed, the throw escape command cannot be executed substantially.

2.5. Automatic Command Execution Method

In this embodiment, when the period in which the throw escape input information is determined to be valid is significantly shorter that the throw motion period or shorter than the communication delay time, it is very difficult for the player to perform a throw escape key input so that the throw escape command is executed. Specifically, the throw escape input information is determined to be invalid unless the player inputs the throw escape input information in a period from the time T126 to the time T128 expecting that the other player inputs the throw input information In this embodiment, the throw escape command is automatically executed under predetermined conditions independently of the input information input by the player in order to solve the above-described problem.

Specifically, when the game machine has determined that the first player's character has hit the second player's character based on the throw input information output from the first buffer 176, the game machine executes the throw escape command under predetermined conditions even if the throw escape input information is not output from the second buffer 178.

For example, when the first game machine has determined that the first player's character has hit the second player's character at the time T136 (see FIG. 4B), the first game machine automatically executes the throw escape command at the time T137 under predetermined conditions.

Therefore, either player can allow the player's character to escape a throw when the player's character is to be thrown by the opposing player's character.

2.6. Lottery Process

In this embodiment, the throw escape command is automatically executed based on a predetermined probability. This is because a throw attack necessarily fails if the throw escape command is necessarily executed.

In this embodiment, a random number table in FIG. 5A in which a random number of 0 to 9 is set in association with each sequential ID (i.e., a positive integer starting from one), a win determination table A, a win determination table B, and a win determination table C in FIG. 5B are provided.

A win range within the random number range (0 to 9) is set in each of the win determination tables A, B, and C based on a win probability.

For example, the win range of the win determination table A is set to be 2 to 9 so that the player wins with a probability of 80%. The win range of the win determination table B is set to be 5 to 9 so that the player wins with a probability of 50%. The win range of the win determination table C is set to be 7 to 9 so that the player wins with a probability of 30%.

In this embodiment, the first game machine and the second game machine share the random number table and the win determination tables A, B, and C before the game starts so that an identical lottery result is obtained by the first game machine and the second game machine. For example, the first game machine or the second game machine transmits the random number table to the other of the first game machine and the second game machine before the game starts. The game machine also transmits the ID value of the random number table referred to when the game starts when transmitting the random number table. The first game machine or the second game machine further transmits the win determination tables A, B, and C to the other of the first game machine and the second game machine before the game starts.

The first game machine according to this embodiment transmits information that indicates whether or not the throw escape command automatic control information is set to the second game machine, and receives information that indicates whether or not the throw escape command automatic control information is set from the second game machine before the game starts. The automatic control information is information that indicates that the throw escape command is executed independently of the input information input by the player.

When the automatic control information is set, the first game machine transmits the type of win determination table ("A", "B", or "C") used in the lottery process.

Likewise, the second game machine according to this embodiment transmits information that indicates whether or not the throw escape command automatic control information is set to the first game machine, and receives information that indicates whether or not the throw escape command automatic control information is set from the first game machine before the game starts.

For example, when the throw escape command automatic control information is not set in the first game machine, the first game machine transmits information (e.g., automatic control information flag=0) that indicates the absence of the automatic control information to the second game machine. When the throw escape command automatic control information is set in the second game machine, the second game machine transmits information (e.g., automatic control information flag=1) that indicates the presence of the automatic control information to the first game machine. When the second lame machine uses the win determination table C in the lottery process, the second game machine transmits the type of win determination table (e.g., "C") to the first game machine.

As illustrated in FIG. 6, each of the first game machine and the second game machine stores the presence or absence of the throw escape command automatic control information (e.g., automatic control information flags) in the storage section in association with each game machine (game machine identification information). When the throw escape command automatic control information is set in association with each game machine (e.g., when the automatic control information flag, is set to "1"), each of the first game machine and the second game machine stores the win determination table used in the lottery process in the storage section.

After the game has started, game calculations are performed based on the presence or absence of the automatic control information.

A process performed by the first game machine when the throw escape command automatic control information is set in the second game machine and the win determination table C is used in the lottery process, is described below.

The first game machine executes the throw command based on valid throw input information output from the first buffer 176, and determines that the first player's character has hit the second player's character The first game machine then acquires the random number associated with a reference ID of the random number table regardless of the input information output from the second buffer 178. When the acquired random number falls within the win range (7 to 9), the first game machine executes the throw escape command.

When the acquired random number does not fall within the win range (7 to 9), the first game machine performs game calculations based on game data output from the second buffer 178 without executing the throw escape command.

In this embodiment, the reference ID of the random number table is changed to the subsequent number each time the lottery process is performed.

According to this embodiment, since the first game machine and the second game machine share the random number table and the presence or absence of the automatic control information set in the first came machine and the second game machine before the game starts, the throw escape command can be executed based on the lottery result even if a communication delay occurs.

2.7. Automatic Control Information Setting Method

In this embodiment, the throw escape command automatic control information and the win determination table used in the lottery process can be set according to the game play count (i.e., the number of times that the player has played the fighting game).

For example, a skill level (1 to 9) is set according to the game play count, and the skill level is increased each time the player has played the game 30 times.

In this embodiment, the throw escape command automatic control information is set to be invalid independently of the input information input by the player when the skill level is 1 to 6. The throw escape command automatic control information can be set based on the input information input by the player when the skill level is 7 or more.

The will determination table C is set when the skill level is 7. A win determination table selected from the win determination tables B and C based on the input information input by the player is set when the skill level is 8.

A win determination table selected from the win determination tables A, B, and C based on the input information input by the player is set when the skill level is 9.

According to this embodiment, since the automatic control information can be set according to the game play count to give the player an advantage and the selection range of the win determination table increases, the player is more involved in game play.

2.8. Skill Setting Method

In this embodiment, one character is selected from a plurality of characters in a character setting screen based on the input information input by the player before the game starts, and the selected character is set to be the player's character operated by the player.

In this embodiment, one or more skills are set in association with the player's character based on the input information input by the player before the game starts after setting the player's character. The term "skill" refers to information that gives the player an advantage. For example, the skill may be right punch success information that indicates that a right punch necessarily succeeds regardless of the throw escape command automatic control information or defense of the player, or right kick success information that indicates that a right kick necessarily succeeds regardless of the defense of the player.

In this embodiment, the first game machine and the second game machine transmit and receive information that indicates the player's character and the skill set in association with the player's character before the game starts.

Specifically, each of the first game machine and the second game machine according to this embodiment stores one or more skills in the storage section in association with the player's character, receives information that indicates the other player's character and the skill set in association with the other player's character from the other game machine, and stores the other player's character and the skill set in association with the other player's character received from the other game machine in the storage section.

3. Timing Chart

Figure 7:
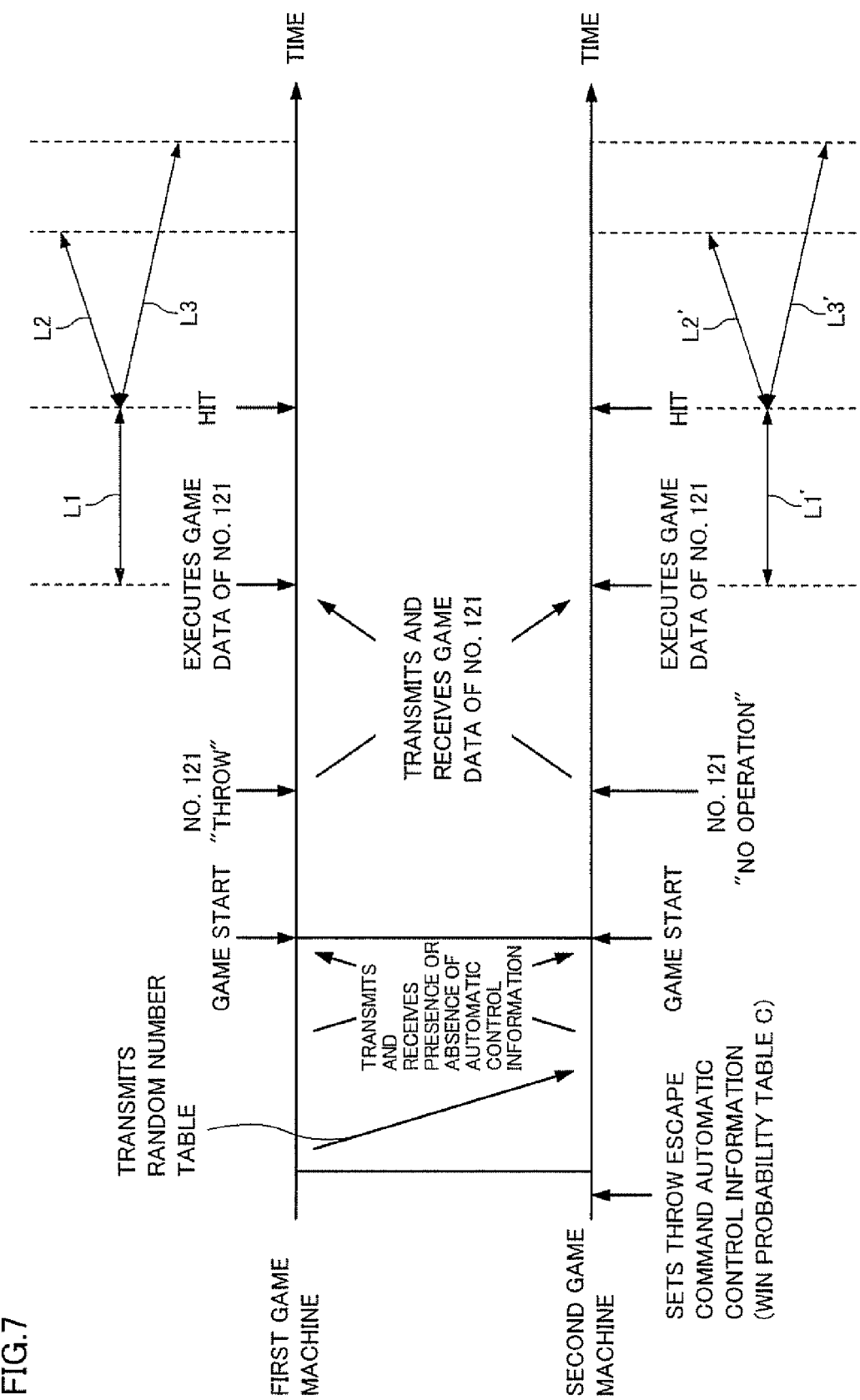
FIG. 7 is a timing chart according to one embodiment of the invention.

A timing chart according to this embodiment is described below with reference to FIG. 7. The following description is given taking an example in which the throw escape command automatic control information is not set in the first game machine and the throw escape command automatic control information is set in the second game machine.

The first game machine transmits the random number table to the second game machine, and the second game machine receives the random number table transmitted from the first game machine before the game starts.

The first game machine and the second game machine transmit and receive information that indicates whether or not the automatic control information is set before the game starts. Since the automatic control information is set in the second game machine, the second game machine transmit the type of win determination table used in the lottery process, and the first game machine receives the type of win determination table transmitted from the second game machine.

When the game has started, each game machine sequentially inputs the input information input by each player to the first buffer 176 and the second buffer 178, sequentially outputs game data having an identical identification number, and performs game calculations.

For example, when the first game machine and the second game machine have transmitted and received game data having an identification number "121", the first game machine and the second game machine perform game calculations based on the game data having an identification number "121" output from the first buffer 176 and the second buffer 178.

Specifically, the first game machine performs motion calculations that cause the first player's character to catch the second player's character in a period L1 based on the game data that includes valid throw input information output from the first buffer 176. Likewise, the second game machine performs motion calculations that cause the first player's character to catch the second player's character in a period L1' based on the game data that includes the throw input information output from the second buffer 178.

When each of the first game machine and the second game machine has determined that the first player's character has hit the second player's character, each of the first game machine and the second game machine determines whether or not the acquired random number falls within the win range of the win determination table C. When the acquired random number has been determined to fall within the win range, the throw escape command is executed.

Specifically, when the acquired random number has been determined to fall within the win range, the first game machine displays a state in which the second player's character escapes a throw by the first player's character in a period L2, and the second game machine displays a state in which the second player's character escapes a throw by the first player's character in a period L2'.

On the other hand, when the acquired random number has been determined to fall outside the win range, the second player's character cannot escape a throw unless the throw escape input information is output from the buffer (the first buffer 176 of the first game machine or the second buffer 178 of the second game machine) that stores the input information input by the second player within the predetermined period after the first player's character has hit the second player's character.

Since the second player normally cannot predict a throw attack by the first player, the throw escape input information is not output. As a result, the first game machine displays a state in which the first player's character throws the second player's character in a period L3, and the second game machine displays a state in which the first player's character throws the second player's character in a period L3'.

The second game machine performs the same process as that of the first game machine after the game has started until the game ends (until the game results are calculated). Specifically, the same game data as the game data input to and output from the second buffer 178 of the first game machine is input to and output from the first buffer 176 of the second game machine, and the same came data as the game data input to and output from the first buffer 176 of the first game machine is input to and output from the second buffer 178 of the second game machine.

Specifically, since the first game machine and the second game machine use the same game data for game calculations, the same automatic control information and random number table are stored in the first game machine and the second game machine, and an identical lottery process is performed by the first game machine and the second game machine, identical game calculations are performed by the first game machine and the second game machine.

Specifically, when the first came machine executes the throw escape command based on the lottery result on condition that the first player's character has hit the second player's character based on the throw input information having an identification number "121", the second game machine also executes the throw escape command based on the lottery result similar to that of the first game machine on condition that the first player's character has hit the second player's character based on the throw input information having an identification number "121".

4. Flowchart

Figure 8:
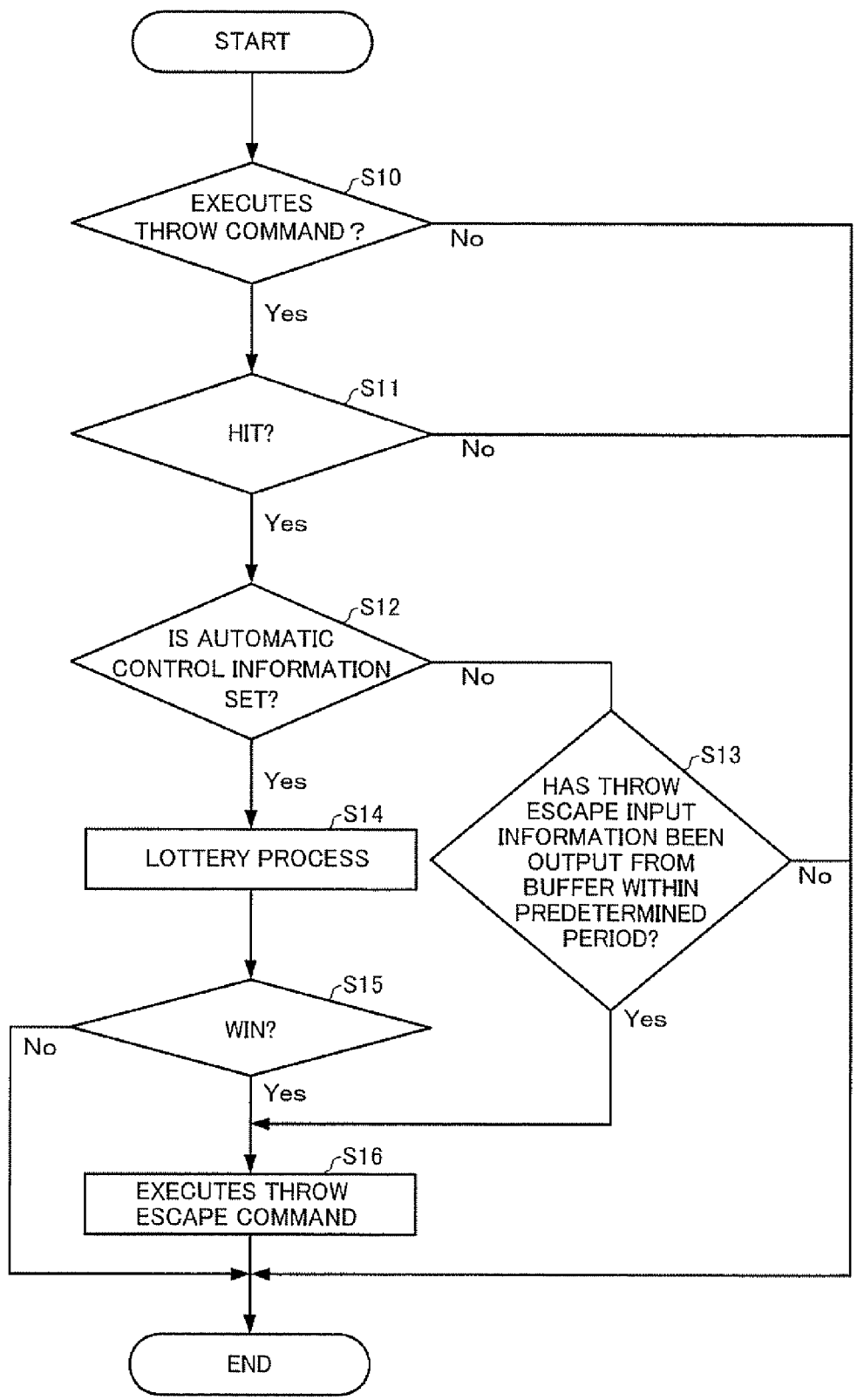
FIG. 8 is a flowchart according to one embodiment of the invention.

The flow of the process performed by each game machine according to this embodiment is described below with reference to FIG. 8.

The game machine determines whether or not to execute the throw command (step S10). For example, the game machine executes the throw command when game data output from the first buffer 176 or the second buffer 178 is the throw input information.

When the game machine has determined to execute the throw command (Yes in step S10), the game machine determines whether or not the first player's character and the second player's character are positioned within a predetermined range (i.e., whether or not the first player's character has hit the second player's character) (step S11).

When the game machine has determined that the first player's character has hit the second player's character (Yes in step S11), the game machine determines whether or not the automatic control information is set in the game machine of the player's character opposite to the player's character that has performed a throw attack (step S12), When the game machine has determined that the automatic control information is set (Yes in step S12), the game machine performs the lottery process (step S14), and determines the lottery result (step S15).

When the game machine has determined that the lottery result is "win" (Yes in step S15), the game machine executes the throw escape command (step S16). For example, the game machine displays a state in which the second player's character escapes a throw performed by the first player's character (i.e., a throw attack fails) so that the second player's character is not damaged by the first player's character. Specifically, the strength value of the second player's character is not reduced due to damage caused by the throw attack.

When the game machine has determined that the lottery result is "loss" (No in step S15), the game machine finishes the process. For example, the game machine displays a state in which the first player's character throws the second player's character (i.e., a throw attack succeeds) so that the second player's character is damaged by the first player's character to reduce the strength value of the second player's character.

When the game machine has determined that the throw escape automatic control command is not set (No in step S12), the game machine determines whether or not the throw escape input information has been output from the buffer corresponding to the player's character opposite to the player's character that has performed a throw attack within the predetermined period (step S13).

When the game machine has determined that the throw escape input information has been output from the buffer within the predetermined period (Yes in step S13), the game machine executes the throw escape command (step S16). When the game machine has determined that the throw escape input information has not been output from the buffer within the predetermined period (No in step S13), the game machine finishes the process.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of tile invention.

What is claimed is:

1. A non-transitory computer-readable information storage medium storing a game program causing a computer to function as:
   a communication control section that transmits data of a computer terminal to an other computer terminal through a network, and receives data of the other computer terminal through the network, the data of the computer terminal including input information input through the computer terminal in accordance with an operation of a player and being associated with identification information of a frame of the computer terminal, and the data of the other computer terminal including input information input through the other computer terminal in accordance with an other operation of an other player and being associated with identification information of a frame of the other computer terminal;
   a calculation section that performs calculations based on the data of the computer terminal and the data of the other computer terminal that have identical identification information;
   a storage section that stores whether or not automatic control information relating to a specific command is set in association with each of the computer terminal and the other computer terminal; and
   a command execution section that performs processing for executing the specific command when the calculation section performs the calculations, and determines whether or not the automatic control information is set in association with the computer terminal when executing the specific command, the command execution section,
   (a) when determining that the automatic control information is not set in association with the computer terminal, performs processing for executing the specific command based on the input information included in the data of the computer terminal,
   (b) when determining that the automatic control information is set in association with the computer terminal, performs processing for executing the specific command under a predetermined condition independently of the input information included in the data of the computer terminal,
   (c) when the automatic control information is set in association with the computer terminal and relates to the specific command, perform processing for executing the specific command based on a result of a lottery process that is common to the computer terminal and the other computer terminal, and
   (d) when the calculation section performs calculations based on a given command input by the other computer terminal, performs processing for executing the specific command during a predetermined period in which the computer terminal is prohibited from performing another command, and determines whether the given command is successful based on the specific command executed by the result of the lottery process or by the input information, 2. The non-transitory computer-readable information storage medium of claim 1, wherein
   the command execution section selects a determination table based on a plurality of skill levels of each of the players, and performs the lottery process based on the selected determination table.

3. A non-transitory computer-readable information storage medium storing a game program causing a computer to function as:
   a communication control section that transmits data of a computer terminal to an other computer terminal through a network, and receives data of the other computer terminal through the network, the data of the computer terminal including input information input through the computer terminal in accordance with an operation of a player and being associated with identification information of a frame of the computer terminal, and the data of the other computer terminal including input information input through the other computer terminal in accordance with an operation of an other player and being associated with identification information of a frame of the other computer terminal;
   a calculation section that performs calculations based on the data of the computer terminal and the data of the other computer terminal that have identical identification information;
   a storage section that stores whether or not automatic control information relating to a specific command is set in association with each of the computer terminal and the other computer terminal; and
   a command execution section that performs processing for executing the specific command when the calculation section performs the calculations, and determines whether or not the automatic control information is set in association with the other computer terminal when executing the specific command, the command execution section
   (a) when determining that the automatic control information is not set in association with the other computer terminal, performs processing for executing the specific command based on the input information included in the data of the other computer terminal,
   (b) when determining that the automatic control information is set in association with the other computer terminal, performs processing for executing the specific command under a predetermined condition independently of the input information included in the data of the other computer terminal,
   (c) when the automatic control information is set in association with the other computer terminal and relates to the specific command, performs processing for executing the specific command based on a result of a lottery process that is common to the computer terminal and the other computer terminal, and
   (d) when the calculation section performs calculations based on a given command input by the computer terminal, performs processing for executing the specific command during a predetermined period in which the other computer terminal is prohibited from performing another command, and determines whether the given command is successful based on the specific command executed by the lottery process or by the input information.

4. The non-transitory computer-readable information storage medium of claim 3, wherein the command execution section selects a determination table based on a plurality of skill levels of each of the players, and performs the lottery process based on the selected determination table.

5. A computer terminal comprising:

a communication control section that transmits data of the computer terminal to an other computer terminal through a network, and receives data of the other computer terminal through the network, the data of the computer terminal including input information input through the computer terminal in accordance with an operation of a player and being associated with identification information of a frame of the computer terminal, and the data of the other computer terminal including input information input through the other computer terminal in accordance with an operation of an other player and being associated with identification information of a frame of the other computer terminal;

a calculation section that performs calculations based on the data of the computer terminal and the data of the other computer terminal that have identical identification information;

a storage section that stores whether or not automatic control information relating to a specific command is set in association with each of the computer terminal and the other computer terminal; and a command execution section that performs processing for executing the specific command when the calculation section performs the calculations, and determines whether or not the automatic control information is set in the computer terminal when executing the specific command, the command execution section (a) when determining that the automatic control information is not set in association with the computer terminal, performs processing for executing the specific command based on the input information included in the data of the computer terminal, (b) when determining that the automatic control information is set in association with the computer terminal, performs processing for executing the specific command under a predetermined condition independently of the input information included in the data of the computer terminal, (c) when the automatic control information is set in association with the computer terminal and relates to the specific command, performs processing for executing the specific command based on a result of a lottery process that is common to the computer terminal and the other computer terminal, and (d) when the calculation section performs calculations based on a given command input by the other computer terminal, performs processing for executing the specific command during a predetermined period in which the computer terminal is prohibited from performing another command, and determines whether the given command is successful based on the specific command executed by the lottery process or by the input information.

6. The computer terminal of claim 5, wherein
the command execution section selects a determination table based on a plurality of skill levels of each of the players, and performs the lottery process based on the selected determination table.

7. A computer terminal comprising:

a communication control section that transmits data of the computer terminal to an other computer terminal through a network, and receives data of the other computer terminal through the network, the data of the computer terminal including input information input through the computer terminal in accordance with an operation of a player and being associated with identification information of a frame of the computer terminal, and the data of the other computer terminal including input information input through the other computer terminal in accordance with an operation of an other player and being associated with identification information of a frame of the other computer terminal;

a calculation section that performs calculations based on the data of the computer terminal and the data of the other computer terminal that have identical identification information;

a storage section that stores whether or not automatic control information relating to a specific command is set in association with each of the computer terminal and the other computer terminal; and a command execution section that performs processing for executing the specific command when the calculation section performs the calculations, and determines whether or not the automatic control information is set in the other computer terminal when executing the specific command, the command execution section (a) when determining that the automatic control information is not set in association with the other computer terminal, performs processing for executing the specific command based on the input information included in the data of the other computer terminal, (b) when determining that the automatic control information is set in association with the other computer terminal, performs processing for executing the specific command under a predetermined condition independently of the input information included in the data of the other computer terminal, (c) when the automatic control in formation is set in association with the other computer terminal and relates to the specific command performs processing for executing the specific command based on a result of a lottery process that is common to the computer terminal and the other computer terminal, and (d) when the calculation section performs calculations based on a given command input by the computer terminal, performs processing for executing the specific command during a predetermined period in which the other computer terminal is prohibited from performing another command, and determines whether the given command is successful based on the specific command executed bar the lottery process or by the input information.

8. The computer terminal of claim 7, wherein
the command execution section selects a determination table based on a plurality of skill levels of each of the players, and performs the lottery process based on the selected determination table.

9. A command execution method comprising:

transmitting data of a computer terminal to an other computer terminal through a network, and receiving data of the other computer terminal through the network, the data of the computer terminal including input information input through the computer terminal in accordance with an operation of a player and being associated with identification information of a frame of the computer terminal, and the data of the other computer terminal including input information input through the other computer terminal in accordance with an operation of an other player and being associated with identification information of a frame of the other computer terminal;

performing calculations based on the data of the computer terminal and the data of the other computer terminal that have identical identification information;

storing whether or not automatic control information relating to a specific command is set in association with each of the computer terminal and the other computer terminal in a storage section;

determining whether or not the automatic control information is set in the computer terminal when executing the specific command; and performing processing for executing the specific command when performing the calculations, including (a) when determining that the automatic control information is not set in association with the computer terminal, performing processing for executing the specific command being performed based on the input information included in the data of the computer terminal, (b) when determining that the automatic control information is set in association with the computer terminal, performing processing for executing the specific command being performed under a predetermined condition independently of the input information included in the data of the computer terminal, (c) when the automatic control information is set in association with the computer terminal and relates to the specific command, performing processing for executing the specific command based on a result of a lottery process that is common to the computer terminal and the other computer terminal, and (d) when the calculation section performs calculations based on a given command input by the other computer terminal, performing processing for executing the specific command during a predetermined period in which the computer terminal is prohibited from performing another command, and determining whether the given command is successful based on the specific command executed by the lottery process or by the input information.

10. The command execution method of claim 9, further comprising:
selecting a determination table based on a plurality of skill levels of each of the players, wherein
the lottery process is performed based on the selected determination table.

11. The command execution method of claim 9, further comprising:
selecting a determination table based on a plurality of skill levels of each of the players, wherein
the lottery process is performed based on the selected determination table.

12. A non-transitory computer-readable information storage medium storing a program causing a computer to function as:
a communication control section that transmits data of a first device, which performs the program, to a second device through a network, and receives data of the second device through the network, the data of the first device including input information input through the first device based on an operation of a player and being associated with identification information of a frame of the first device and the data of the second device including input information input through the second device based on an operation of an other player and being associated with identification information of a frame of the second device;

a calculation section that performs calculations based on the data of the first device and the data of the second device that have identical identification information;

a storage section that stores whether or not automatic control information relating to a specific command is set in association with each of the first device and the second device; and a command execution section that performs processing for executing the specific command when the calculation section performs the calculations, and determines whether or not the automatic control information is set in one of the first and second devices when executing the specific command, the command execution section (a) when determining that the automatic control information is not set in association with the one of the first and second devices, performs processing for executing the specific command based on the input information included in the data of the one of the first and second devices, (b) when determining that the automatic control information is set in association with the one of the first and second devices, performs processing for executing the specific command under a predetermined condition independently of the input information included in the data of the one of the first and second devices, (c) when the automatic control information is set in association with the one of the first and second devices and relates to the specific command, performs processing for executing the specific command based on a result of a lottery process that is common to both of the first and second devices, and (d) when the calculation section performs calculations based on a given command input by the other of the first and second devices, performs processing for executing the specific command during a predetermined period in which the one of the first and second devices is prohibited from performing another command, and determines whether the given command is successful based on the specific command executed by the lottery process or by the input information.

13. The non-transitory computer-readable information storage medium of claim 12, wherein
the command execution section selects a determination table based on a plurality of skill levels of each of the players, and performs the lottery process based on the selected determination table.

14. A command execution method comprising:
transmitting data of a computer terminal to an other computer terminal through a network, and receiving data of the other computer terminal through the network, the data of the computer terminal including input information input through the computer terminal in accordance with an operation of a player and being associated with identification information of a frame of the computer terminal, and the data of the other computer terminal including input information input through the other computer terminal in accordance with an operation of an other player and being associated with identification information of a frame of the other computer terminal;

performing calculations based on the data of the computer terminal and the data of the other computer terminal that have identical identification information;

storing whether or not automatic control information relating to a specific command is set in association with each of the computer terminal and the other computer terminal in a storage section;

determining whether or not the automatic control information is set in the other computer terminal when executing the specific command; and performing processing for executing the specific command when performing the calculations, including (a) when determining that the automatic control information is not set in association with the other computer terminal, performing processing for executing the specific command being performed based on the input information included in the data of the other computer terminal (b) when determining that the automatic control information is set in association with the other computer terminal, performing processing for executing the specific command being performed under a predetermined condition independently of the input information included in the data of the other computer terminal (c) when the automatic control information is set in association with the other computer terminal and relates to the specific command, performing processing for executing the specific command based on a result of a lottery process that is common to the computer terminal and the other computer terminal, and (d) when the calculation section performs calculations based on a given command input by the computer terminal, performing processing for executing the specific command during a predetermined period in which the other computer terminal is prohibited from performing another command, and determining whether the given command is successful based on the specific command executed by the lottery process or by the input information.

* * * * *